United States Patent
Li (10) Patent No.: US 10,776,564 B2
(45) Date of Patent: Sep. 15, 2020

(54) METHOD AND SYSTEM FOR DISPLAYING WEBPAGE SELF-DEFINED CONTENT

(71) Applicant: UC Mobile Co., Ltd., Beijing (CN)

(72) Inventor: Xiaoming Li, Beijing (CN)

(73) Assignee: UC Mobile Co., Ltd., Beijing (CN)

( * ) Notice: Subject to any disclaimer, the term of this patent is extended or adjusted under 35 U.S.C. 154(b) by 190 days.

(21) Appl. No.: 15/247,328

(22) Filed: Aug. 25, 2016

(65) Prior Publication Data

US 2016/0364496 A1 Dec. 15, 2016

Related U.S. Application Data

(63) Continuation of application No. PCT/CN2014/087761, filed on Sep. 29, 2014.

(30) Foreign Application Priority Data

Feb. 27, 2014 (CN) .......................... 2014 1 0069433

(51) Int. Cl.
  *G06F 40/14* (2020.01)
  *G06F 16/957* (2019.01)
  (Continued)

(52) U.S. Cl.
  CPC ............ *G06F 40/14* (2020.01); *G06F 16/955* (2019.01); *G06F 16/958* (2019.01); *G06F 16/9577* (2019.01); *H04L 67/02* (2013.01)

(58) Field of Classification Search
  CPC ........................ G06F 17/2247; G06F 17/30867
  See application file for complete search history.

(56) References Cited

U.S. PATENT DOCUMENTS 7,325,196 B1 * 1/2008 Covington ............ G06F 16/958
  715/251
8,356,277 B1 * 1/2013 Bank .................... G06F 9/45529
  717/111
(Continued)

FOREIGN PATENT DOCUMENTS

CN 101115068 1/2008
CN 101320387 A 12/2008
(Continued)

OTHER PUBLICATIONS

International Search Report and Written Opinion for Application No. PCT/CN2014/087761, dated Dec. 30, 2014, 10 pages.
(Continued)

*Primary Examiner* — Scott T Baderman
*Assistant Examiner* — Benjamin Smith
(74) *Attorney, Agent, or Firm* — Sheppard Mullin Richter & Hampton LLP (57) ABSTRACT

A method for displaying webpage content includes acquiring webpage source code of a webpage to be accessed, and stopping rendering the webpage to be accessed, in the acquired webpage source code, searching for a location where a webpage node of a webpage interface needs to be inserted, inserting a webpage node code segment of the webpage interface into the webpage source code at the found location where the webpage node of the webpage interface needs to be inserted, and performing webpage rendering on the webpage source code into which the webpage node code segment of the webpage interface has been inserted, and displaying a rendered webpage.

12 Claims, 7 Drawing Sheets

(51) Int. Cl.
*G06F 16/955* (2019.01)
*G06F 16/958* (2019.01)
*H04L 29/08* (2006.01)

(56) References Cited

U.S. PATENT DOCUMENTS

| | | | | |
|---|---|---|---|---|
| 8,666,835 | B2* | 3/2014 | Minnis | H04L 67/22 705/26.1 |
| 8,682,741 | B2* | 3/2014 | Minnis | G06Q 30/0641 705/26.1 |
| 8,751,925 | B1* | 6/2014 | Zhang | G06F 40/14 715/241 |
| 9,189,207 | B2* | 11/2015 | Torgemane | G06F 40/154 |
| 9,282,145 | B2* | 3/2016 | Wei | H04L 67/2804 |
| 9,317,622 | B1 | 4/2016 | Zuromski | G06F 17/30905 |
| 9,451,006 | B1* | 9/2016 | Miller | H04L 67/42 |
| 9,912,767 | B1* | 3/2018 | Weald | H04L 67/42 |
| 10,284,666 | B1* | 5/2019 | Weald | H04L 67/34 |
| 2003/0182453 | A1* | 9/2003 | Kim | G06F 16/9577 709/246 |
| 2005/0131992 | A1* | 6/2005 | Goldstein | G06F 3/0481 709/202 |
| 2005/0187895 | A1 | 8/2005 | Paya et al. | |
| 2007/0157078 | A1* | 7/2007 | Anderson | G06F 17/2247 715/207 |
| 2007/0256003 | A1* | 11/2007 | Wagoner | G06F 16/958 715/205 |
| 2008/0120364 | A1* | 5/2008 | Chari | G06Q 30/02 709/203 |
| 2008/0201643 | A1* | 8/2008 | Nagaitis | G06F 17/30867 715/738 |
| 2010/0121694 | A1* | 5/2010 | Bharadwaj | G06Q 30/02 705/14.4 |
| 2011/0055683 | A1* | 3/2011 | Jiang | G06F 17/30899 715/234 |
| 2012/0036264 | A1* | 2/2012 | Jiang | G06F 17/30902 709/226 |
| 2012/0089456 | A1* | 4/2012 | Gupta | G06O 30/0246 705/14.45 |
| 2012/0174236 | A1* | 7/2012 | Goodwin | H04L 63/102 726/27 |
| 2012/0191541 | A1* | 7/2012 | Yang | G06Q 30/0241 705/14.53 |
| 2012/0272136 | A1* | 10/2012 | Takami | G06F 17/30867 715/234 |
| 2013/0104021 | A1* | 4/2013 | van den Broek | G06F 40/166 715/220 |
| 2013/0151943 | A1* | 6/2013 | Zhu | G06F 16/9577 715/234 |
| 2013/0212465 | A1* | 8/2013 | Kovatch | G06F 17/227 715/234 |
| 2014/0298159 | A1* | 10/2014 | Kim | G06F 16/904 715/234 |
| 2014/0304590 | A1* | 10/2014 | Zhang | G06F 40/14 715/234 |
| 2014/0344674 | A1* | 11/2014 | Zhu | G06F 16/9577 715/240 |
| 2015/0088968 | A1* | 3/2015 | Wei | H04L 67/10 709/203 |

FOREIGN PATENT DOCUMENTS

| | | |
|---|---|---|
| CN | 101788991 A | 7/2010 |
| CN | 102662672 A | 9/2012 |
| CN | 104063415 A | 9/2014 |

OTHER PUBLICATIONS

International Preliminary Report on Patentability for Application No. PCT/CN2014/087761, dated Aug. 30, 2016, 13 pages.
International Search Report for Application No. PCT/CN2014/087761, dated Dec. 30, 2014.
First Notice issued by China State Intellectual Property Office, dated Dec. 30, 2016 for Chinese Patent Application No. 201410069433.2 with search report.
Second Office Action dated Sep. 27, 2017, issued in related Chinese Application No. 201410069433.2, with English machine translation (7 pages).
First Examination Report dated Feb. 3, 2020, issued in related Indian Patent Application No. 201647029577 (6 pages).

* cited by examiner

METHOD AND SYSTEM FOR DISPLAYING WEBPAGE SELF-DEFINED CONTENT

CROSS-REFERENCE TO RELATED APPLICATIONS

This application is a continuation application of International Application No. PCT/CN2014/087761, filed Sep. 29, 2014, which is based upon and claims priority to the Chinese Patent Application No. 201410069433.2, filed with the Chinese Patent Office on Feb. 27, 2014, and entitled "METHOD AND SYSTEM FOR DISPLAYING WEBPAGE SELF-DEFINED CONTENT." The above-referenced applications are incorporated herein by reference in their entirety.

TECHNICAL FIELD

The present invention relates to the field of mobile browsers, and in particular, to a method and system for displaying webpage custom content.

BACKGROUND ART

A webpage browser is software that is used to display files on a webpage server or in a document system and allows a user to interact with these files. Content displayed on a webpage includes text, images, or information. In actual applications, if a browser needs to display custom content after loading a webpage, a technician needs to make an additional interface to display the custom content. In addition, if the content of the interface needs to be modified, code and resources of a client terminal application program need to be modified.

Figure 1:
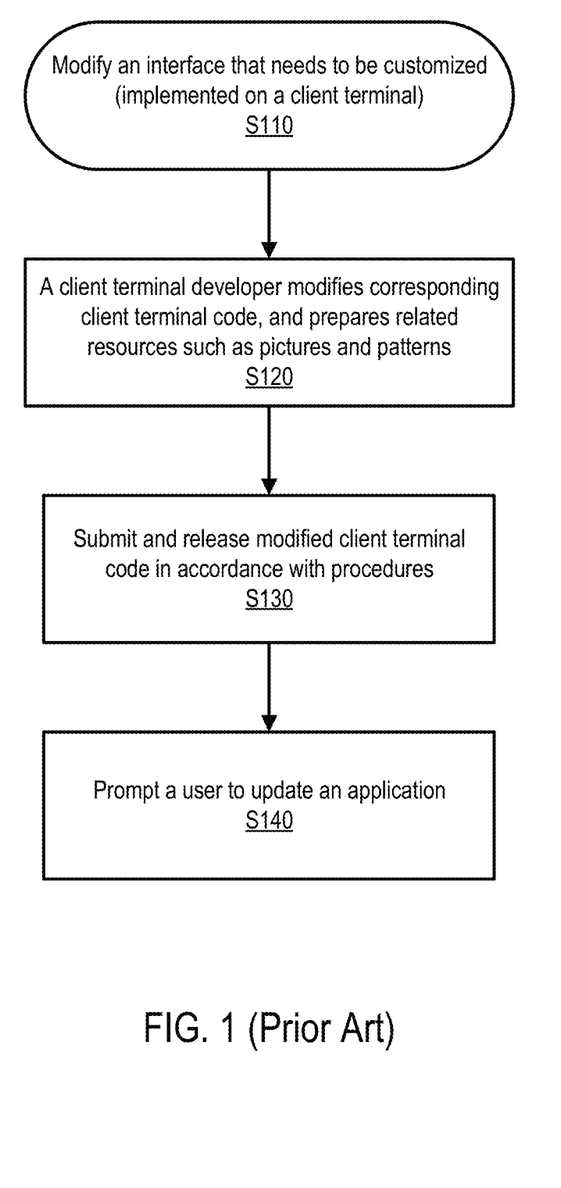
FIG. 1 is a conventional flowchart of a process from modifying interface code of a client terminal to obtaining a new interface program by a user.

FIG. 1 shows a conventional process from modifying interface code of a client terminal to obtaining, by a user, a new interface program. As shown in FIG. 1, the process from modifying interface code of a client terminal to obtaining, by a user, a new interface program may include:

S110: Modify an interface that needs to be customized, where the modification on the interface that needs to be customized is implemented by modifying code of a client terminal.

S120: A client terminal developer modifies corresponding client terminal code, and prepares corresponding resources such as pictures and patterns.

S130: Test modified code and resources of an application program of the client terminal, and submit and release the modified code and resources in accordance with procedures.

S140: Prompt a user to update the application.

The process of submitting and releasing the modified code and resources in accordance with procedures after the test in Step S130 generally takes a long time. When the code of the client terminal is modified, more tests are required. When the client terminal has a problem, the developer needs to modify and release the code again. Thus, significant changes need to be made and costs are high.

Figure 2:
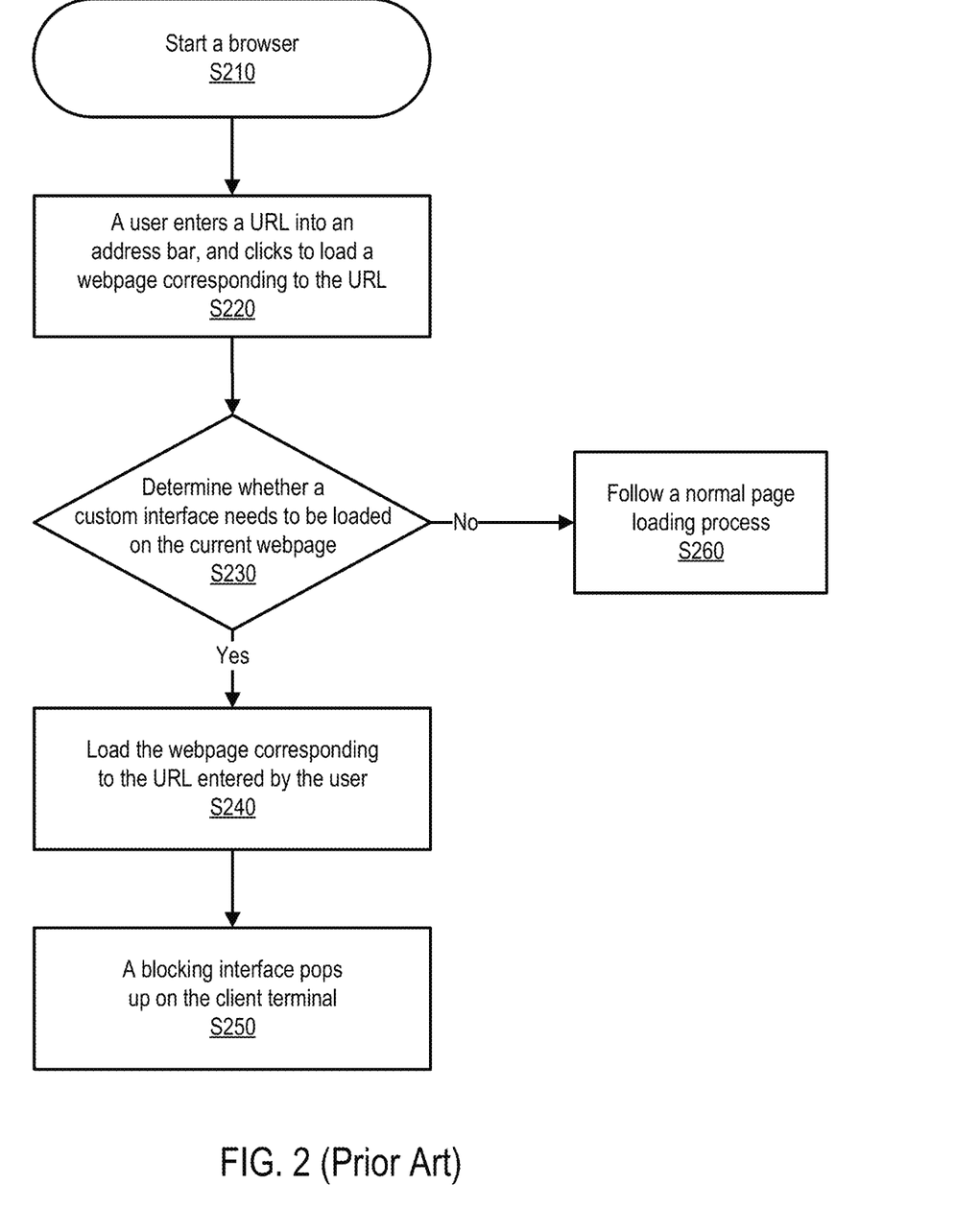
FIG. 2 is a flowchart of implementing, on a client terminal, a conventional method for displaying webpage custom content.

FIG. 2 shows a process of implementing, on a client terminal, a conventional method for displaying webpage custom content. As shown in FIG. 2, the implementation, on a client terminal, of the conventional method for displaying webpage custom content includes:

S210: Start a mobile browser, send a resource requesting signal to a server, and the server returns a list of URLs to which a custom interface needs to be loaded.

S220: A user enters, into a user address bar, a URL that the user wants to browse, and clicks to load a webpage corresponding to the URL entered by the user.

S230: The client terminal determines whether the custom interface needs to be inserted on the current webpage.

S240: Load the webpage corresponding to the URL entered by the user, and when the custom interface needs to be loaded on the webpage corresponding to the URL entered by the user, load the webpage corresponding to the URL entered by the user.

S250: A blocking interface pops up on the client terminal, and after the webpage corresponding to the URL entered by the user is loaded, display the interface that includes custom content.

S260: When the custom interface does not need to be loaded on the webpage corresponding to the URL entered by the user, perform a normal webpage loading process to display the original webpage interface.

When a client terminal is used to implement displaying a custom webpage, a native interface of the client terminal blocks a webpage browsing operation performed by a user, and a style of the custom interface is inconsistent with that of the native webpage. The webpage needs to be modified, and the client terminal also needs to be modified. Such operations are complex.

Figure 9:
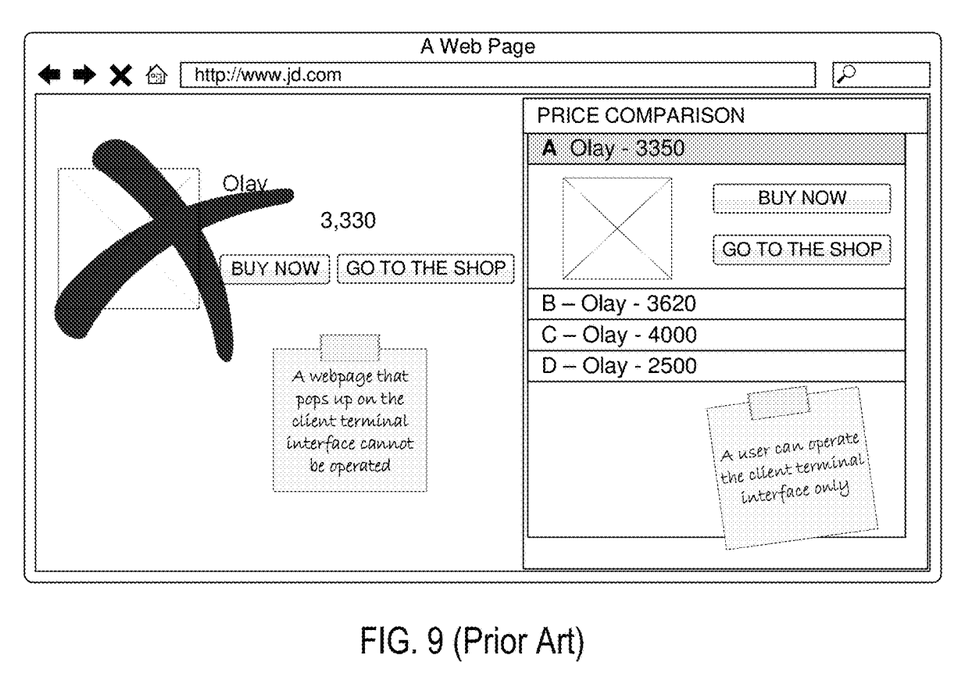
FIG. 9 is a schematic view of a page state when custom content is inserted by using a conventional method.

FIG. 9 shows a schematic view of a page when custom content is inserted by using a conventional method. A user cannot control the area with the sign X on the left of the page, and only the area on the right of the page can be changed. An interface produced this way is inconsistent with content of the original page.

In conclusion, generally, if a browser needs to display custom content after loading a webpage, an interface needs to be modified, and therefore, code and resources of a client terminal application program need to be modified. However, it costs a lot to modify the code and interface of the client terminal application program. Meanwhile, an additional interface needs to be produced for display, and the interface produced in this manner can hardly be consistent with content of the original page, which hinders, in some degree, operations performed by the user on the webpage, and user experience is poor.

SUMMARY

According to some embodiments of the present disclosure, a method for displaying webpage content is provided. The method includes, when a webpage interface needs to be inserted into a webpage to be accessed, acquiring webpage source code of the webpage to be accessed, and stopping rendering the webpage to be accessed, in the acquired webpage source code, searching for a location where a webpage node of the webpage interface needs to be inserted, according to the found location where the webpage node of the webpage interface needs to be inserted, inserting a webpage node code segment of the webpage interface into the webpage source code, and performing webpage rendering on the webpage source code into which the webpage node code segment of the webpage interface has been inserted, and displaying a rendered webpage.

The location where the webpage node of the webpage interface needs to be inserted is searched for in the webpage source code according to a code resource of the webpage interface. The code resource of the webpage interface includes: a URL of a webpage into which the webpage interface needs to be inserted, an insertion location of the webpage node of the webpage interface, and the webpage node code segment of the webpage interface.

The method may further include: determining, according to a list of URLs where the webpage interface needs to be inserted, whether the webpage interface needs to be inserted into the webpage to be accessed. When it is determined that the webpage interface needs to be inserted into the webpage to be accessed, the method includes the steps as described above. When it is determined that the webpage interface does not need to be inserted into the webpage to be accessed, the method may further include continuing a process of browsing the webpage, and normally displaying the original webpage.

In some embodiments, the webpage node code segment of the webpage interface is inserted into the webpage source code by using a dynamic script. The dynamic script may be in one of these languages: JavaScript, Jquery, or PHP.

The present disclosure further provides a system for displaying webpage content. According to some embodiments, the system includes a webpage source code acquiring unit configured to, when a webpage interface needs to be inserted into a webpage to be accessed, acquire webpage source code of the webpage to be accessed, and stop rendering the webpage to be accessed, a location searching unit configured to, after the webpage source code of the webpage to be accessed is acquired, acquire, according to a code resource of the webpage interface, a location where a webpage node of the webpage interface needs to be inserted, a webpage node insertion unit, configured to insert content of the webpage node of the webpage interface into the webpage source code according to the found location where the webpage node of the webpage interface needs to be inserted, and, a webpage display unit, configured to perform webpage rendering on the webpage source code into which the content of the webpage node of the webpage interface has been inserted, and display a rendered webpage for a user.

In the location searching unit, the code resource of the webpage interface includes: a URL of a webpage into which the webpage interface needs to be inserted, an insertion location of the webpage node of the webpage interface, and a webpage node code segment of the webpage interface.

In some embodiments, the system may further includes a URL determining unit, configured to acquire a list of URLs where the webpage interface needs to be inserted and the code resource of the webpage interface, and determine, according to the list of URLs where the webpage interface needs to be inserted, whether the webpage interface needs to be inserted into the webpage to be accessed; when the webpage interface needs to be inserted into the webpage to be accessed, instruct the webpage source code acquiring unit to acquire the webpage source code of the webpage to be accessed, and instruct the webpage display unit to stop rendering the webpage to be accessed; and when the webpage interface does not need to be inserted into the webpage to be accessed, instruct the webpage display unit to continue a process of browsing the webpage and display the original webpage normally.

In the webpage node insertion unit, the webpage node code segment of the webpage interface is inserted into the webpage source code by using a dynamic script. The dynamic script may be in one of these languages: JavaScript, Jquery, or PHP.

The present disclosure further provides a terminal for displaying webpage content. The terminal may include a processor and a memory that stores computer executable instructions. The instructions, when executed by the processor, cause the processor to perform determining whether a webpage interface needs to be inserted into a webpage to be accessed, if the determination is yes, acquiring webpage source code of the webpage to be accessed, and stopping rendering the webpage to be accessed, in the acquired webpage source code, searching for a location where a webpage node of the webpage interface needs to be inserted, according to the found location where the webpage node of the webpage interface needs to be inserted, inserting a webpage node code segment of the webpage interface into the webpage source code, and performing webpage rendering on the webpage source code into which the webpage node code segment of the webpage interface has been inserted, and displaying a rendered webpage.

According to some embodiments, in the acquired webpage source code, searching for a location where a webpage node of the webpage interface needs to be inserted may include: according to a code resource of the webpage interface, in the webpage source code, searching for the location where the webpage node of the webpage interface needs to be inserted, where the code resource of the webpage interface includes: a URL of a webpage into which the webpage interface needs to be inserted, an insertion location of the webpage node of the webpage interface, and the webpage node code segment of the webpage interface.

In some embodiments, determining whether a webpage interface needs to be inserted into a webpage to be accessed may include acquiring a list of URLs where the webpage interface needs to be inserted and the code resource of the webpage interface, and determining, according to the list of URLs where the webpage interface needs to be inserted, whether the webpage interface needs to be inserted into the webpage to be accessed. If it is determined that the webpage interface needs to be inserted into the webpage to be accessed, the processor acquires the webpage source code of the webpage to be accessed, and stops rendering the webpage to be accessed. If it is determined that the webpage interface does not need to be inserted into the webpage to be accessed, the processor continues a process of browsing the webpage, and displays the original webpage normally.

In some embodiments, inserting a webpage node code segment of the webpage interface into the webpage source code may include inserting, by using a dynamic script, the webpage node code segment of the webpage interface into the webpage source code. The dynamic script is in one of these languages: JavaScript, Jquery or PHP.

The present disclosure further provides a non-transitory computer readable storage medium that stores computer executable instructions, that when executed by a processor, causes the processor to perform acquiring webpage source code of a webpage to be accessed, and stopping rendering the webpage to be accessed, in the acquired webpage source code, searching for a location where a webpage node of a webpage interface needs to be inserted, inserting a webpage node code segment of the webpage interface into the webpage source code at the found location where the webpage node of the webpage interface needs to be inserted, and performing webpage rendering on the webpage source code into which the webpage node code segment of the webpage interface has been inserted, and displaying a rendered webpage.

By means of the foregoing method and system for displaying webpage content according to the embodiments of the present disclosure, a server delivers a URL list and a content resource of a webpage, which can implement, without modifying a mobile client terminal, displaying a webpage added with custom content after a user opens the webpage, avoiding that code and an interface of a client terminal need to be modified to display custom content, thereby reducing costs on labor and resources; besides, it is unnecessary to additionally generate an interface to display a custom page, and therefore, operations of the user are not hindered, and the user's browsing experience is improved.

To implement the foregoing and related objectives, one or more aspects of the present invention include the features that are described in detail below and are specifically pointed out in the claims. The following description and the accompanying drawings illustrate some exemplary aspects of the present invention in detail. However, these aspects indicate only some of the various manners that can use the principle of the present invention. In addition, the present invention is intended to include all these aspects and their equivalents.

BRIEF DESCRIPTION OF THE DRAWINGS

With reference to the following description in combination with the accompanying drawings and the content of the claims, and with a more comprehensive understanding of the present invention, other objectives and results of the present invention will be more clear and easy to understand. In the accompanying drawings:

In all the accompanying drawings, same reference numerals indicate similar or corresponding features or functions.

DETAILED DESCRIPTION

Specific embodiments of the present invention will be described in detail below with reference to the accompanying drawings.

For the purpose of illustration, in the following descriptions of exemplary implementations of the present invention, the terms "mobile browser" and "client terminal" may have the same meaning, or the "mobile browser" may be one example, but not the only specific manifestation of the "client terminal."

Figure 3:
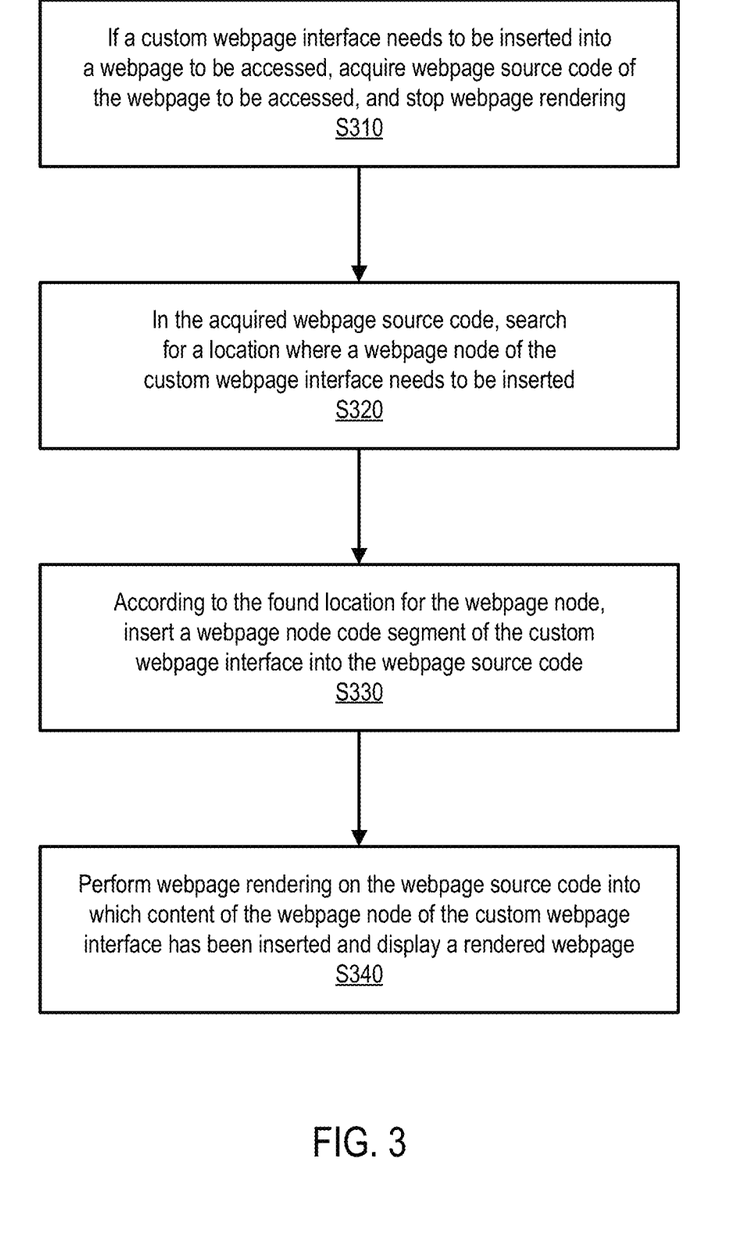
FIG. 3 is a flowchart of a method for displaying webpage custom content according to an embodiment of the present invention.

FIG. 3 shows a method for displaying webpage content. The webpage content can include webpage custom content, e.g., a user defined webpage content, according to an embodiment of the present invention. As shown in FIG. 3, the method for displaying webpage custom content may include:

S310: When it is determined that a webpage interface, e.g., a custom webpage interface, needs to be inserted into a webpage to be accessed, acquire webpage source code of the webpage to be accessed, and stop rendering the webpage to be accessed.

Before entering a URL to be accessed into a mobile browser, a user starts the mobile browser, and while the mobile browser is started, information that requests a webpage source code resource of a custom webpage is sent. When the mobile browser initiates a request to a server, it further includes acquiring a list of URLs where the custom webpage interface needs to be inserted and a code resource of the custom interface corresponding to the URLs in the URL list. The list of URLs where the custom webpage interface needs to be inserted and the code resource of the custom interface corresponding to the URLs in the URL list may be delivered by the server to the client terminal, or may be preset in the client terminal.

In addition, in this step, when the URL entered by the user cannot be found in the list of URLs where the custom webpage interface needs to be inserted, a process of browsing the webpage is continued, and the original webpage is displayed normally.

S320: In the acquired webpage source code, search for a location where a webpage node of the custom webpage interface needs to be inserted.

In this step, the location where the webpage node of the custom webpage interface needs to be inserted is searched for in the webpage source code according to a code resource of the custom webpage interface. The code resource of the custom webpage interface includes: a URL of a webpage into which the custom webpage interface needs to be inserted, an insertion location of the webpage node of the custom webpage interface, and a webpage node code segment of the custom webpage interface.

S330: According to the found location where the webpage node of the custom webpage interface needs to be inserted, insert a webpage node code segment of the custom webpage interface into the webpage source code, where, at the found location where the webpage node for displaying the custom webpage interface needs to be inserted, content of the webpage node for displaying the custom webpage interface is inserted into the webpage source code by using a dynamic script. The dynamic script can be JavaScript, Jquery, or PHP (Hypertext Preprocessor). Jquery is a light weight JavaScript library.

S340: Perform webpage rendering on the webpage source code into which content of the webpage node for displaying the custom webpage interface has been inserted, and display a rendered webpage for the user.

In this step, after the rendered webpage interface that includes the custom content is displayed for the user, the displayed webpage that includes the custom webpage interface can still be operated, which does not hinder the user's operations on the webpage. The custom interface is implemented by means of webpage node embedding, and it is ensured that the custom interface is integrated with the original webpage.

In some embodiments, the method for displaying webpage custom content may further include: acquiring a list of URLs where the custom webpage interface needs to be inserted and the code resource of the custom webpage interface; determining, according to the list of URLs where the custom webpage interface needs to be inserted, whether the custom webpage interface needs to be inserted into the webpage to be accessed; when the custom webpage interface needs to be inserted into the webpage to be accessed, acquiring the webpage source code of the webpage to be accessed, and stopping rendering the webpage to be accessed; and when the custom webpage interface does not need to be inserted into the webpage to be accessed, continuing a process of browsing the webpage, and normally displaying the original webpage.

The list of URLs where the custom webpage interface needs to be inserted and the code resource of the custom webpage interface may be delivered by the server to the client terminal, or may be preset in the client terminal.

When the user opens the webpage, a resource of the webpage source code is requested from a corresponding webpage server, and then the webpage server returns information about the webpage source code. For example, if the user accesses www.xx.com, an http request is initiated to a server of this webpage, and a process of rendering and depicting the webpage is stopped after the webpage source code is acquired, and according to a correspondingly delivered code resource of a custom interface, the webpage source code is traversed to find a location of a webpage node where custom webpage node code needs to be added.

In some embodiments of the method for displaying webpage custom content, a server delivers a URL list and a content resource of a custom webpage, which can implement, without modifying a mobile client terminal, displaying a webpage added with custom content after a user opens the webpage, avoiding that code and an interface of a client terminal need to be modified to display the custom content, thereby reducing costs on labor and resources; besides, it is unnecessary to generate an additional interface to display a custom page, and therefore, operations on the webpage of the user are not hindered, and user experience is improved.

Figure 4:
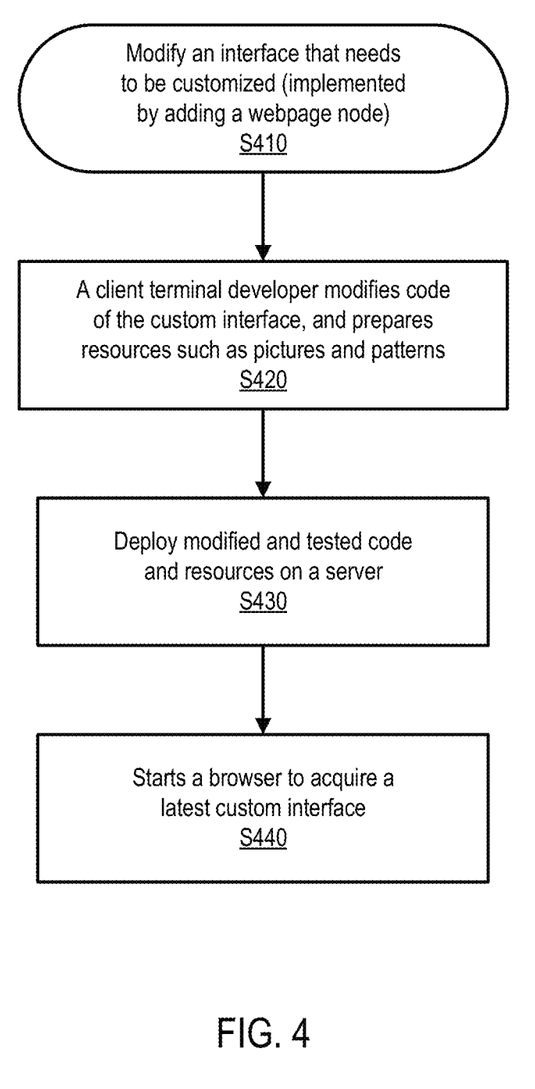
FIG. 4 is a schematic flowchart, when an interface needs to be modified, of a method for displaying webpage custom content according to an embodiment of the present invention.

FIG. 4 shows a process for displaying webpage custom content according to an embodiment of the present disclosure. As shown in FIG. 4, when an interface needs to be modified, the process for displaying webpage custom content includes:

S410: Modify an interface that needs to be customized. casein some embodiments, the modification can be implemented by using a method of adding a webpage node as discussed above.

S420: Modifies code of a custom webpage, and prepares resources such as pictures and patterns.

In this step, a webpage node is added to display custom content of a webpage, and custom interface content is updated by updating code of the custom webpage, avoiding modifying a custom interface by repeatedly modifying code on the client terminal.

S430: Deploy, on a server, modified and tested code and resources of the custom interface.

After being modified and tested, the code of the custom interface is deployed on the server, and a user can acquire a latest custom interface. After a problem occurs, the custom interface can be modified by modifying code of the custom webpage, and it is unnecessary to spend much time on modifying the code on the client terminal.

S440: A user does not need to update applications, and can obtain a latest custom interface by starting a mobile browser.

In some embodiments, the method for displaying webpage custom content is implemented by adding a webpage node; a server delivers a URL list and a content resource of a custom webpage, which can implement, without modifying a mobile client terminal, displaying a webpage added with custom content after a user opens the webpage, avoiding that code and an interface of a client terminal need to be modified to display the custom content, thereby reducing costs on labor and resources.

Figure 5:
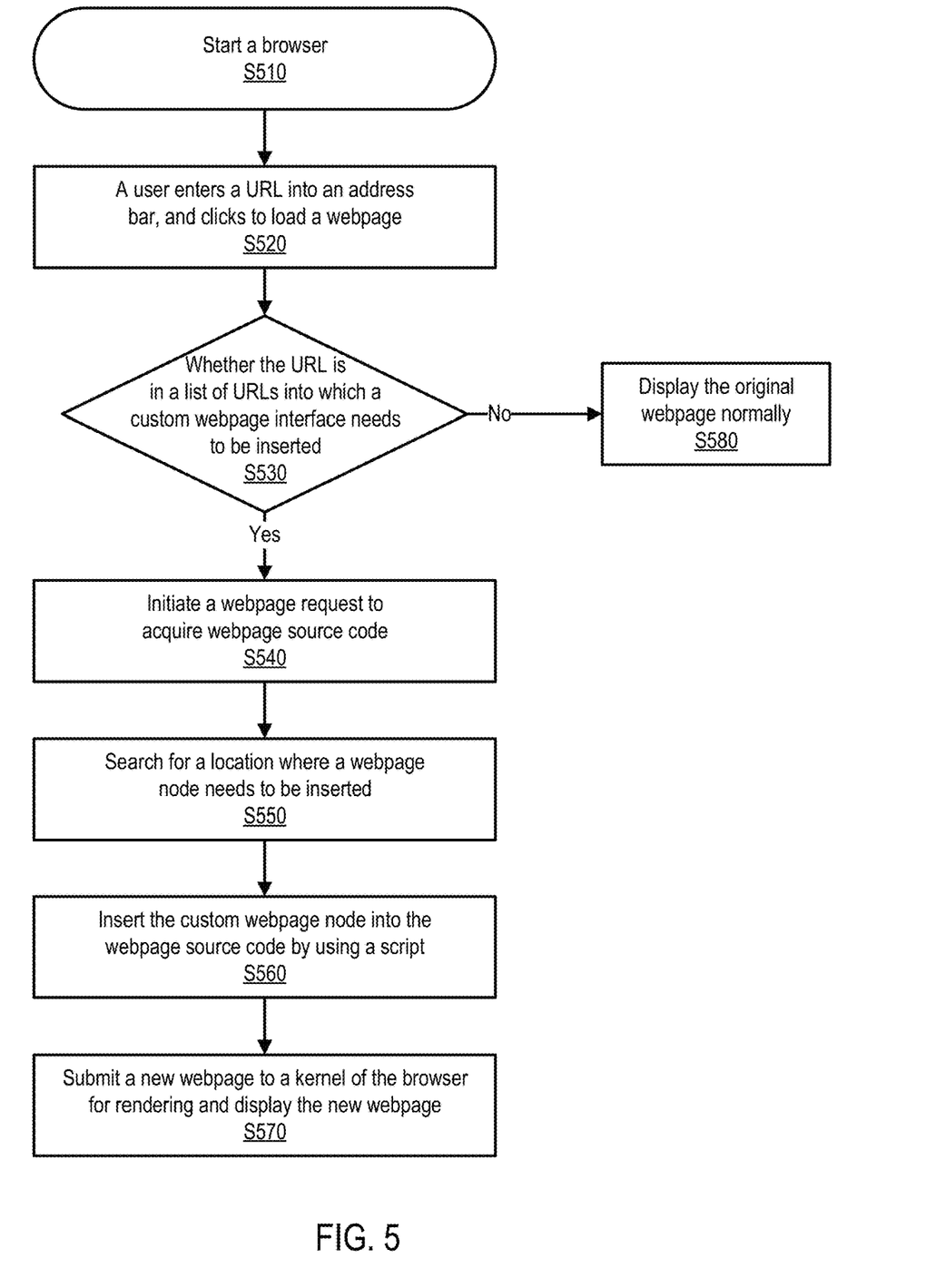
FIG. 5 is a detailed flowchart of a method for displaying webpage custom content according to an embodiment of the present invention.

FIG. 5 shows a detailed process of a method for displaying webpage custom content according to an embodiment of the present disclosure. As shown in FIG. 5, the detailed process of the method for displaying webpage custom content includes:

S510: Start a mobile browser: when a client terminal starts the mobile browser, the client terminal sends a resource requesting signal to a server, and the server delivers, to the client terminal, a list of URLs where a custom webpage interface needs to be inserted and a corresponding custom interface code resource.

In a process of acquiring, by the client terminal, a set that includes the list of URLs where the custom webpage interface needs to be inserted and the corresponding custom interface code resource, the list of URLs where the custom webpage interface needs to be inserted and the corresponding custom interface code resource may be delivered by the server to the client terminal, or may be preset in the client terminal. A set of custom interface code may correspond to webpages of sub-domain names under a same domain name. Generally, webpages belonging to a same domain name are written similarly, and can be adapted by using a same set of code.

Specifically, the list of URLs where the custom webpage interface needs to be inserted is used to determine whether the custom interface needs to be inserted into webpage source code of a current page; when a URL corresponding to the current page (that is, a webpage corresponding to a URL entered by the user) is in the list of URLs where a custom webpage interface needs to be inserted, a location where a webpage node needs to be inserted and content of the webpage node for displaying the custom webpage interface can be found in the custom interface code resource. A data structure of the custom interface code resource is shown in Table 1:

TABLE 1

| Field name | Function | Effect and use method | Mandatory or not | Type |
|---|---|---|---|---|
| url | URL where the custom interface needs to be inserted | One-to-one corresponding to each item in the list of URLs where the custom interface needs to be inserted | Yes | Character string |
| node | Insertion location | Labeled location for inserting the custom interface, where generally, a unique HTML label needs to be marked to serve as an insertion location | Yes | Character string |
| script | Webpage node code segment of the custom interface | It can be directly inserted into a location where it needs to be inserted, and is generally HTML source code of the custom interface. | Yes | Character string |

S520: The user enters a URL, and clicks to load a webpage corresponding to the URL.

Specifically, the user enters, into a user address bar of the started browser, a URL that needs to be accessed, and clicks to load a webpage corresponding to the URL. At the same time, the client terminal initiates a request for a source code resource of the custom webpage.

S530: Determine, whether the URL is in the list of URLs where the custom webpage interface needs to be inserted, and when the entered URL is in the list of URLs where the custom webpage interface needs to be inserted, go to step S540; otherwise, go to step S580.

Specifically, the client terminal determines whether the URL entered by the client terminal is in the list of URLs where the custom webpage interface needs to be inserted, and performs the next step according to a determining result. If the URL entered by the client terminal is not in the list of URLs where the custom webpage interface needs to be inserted, a process of browsing the webpage is continued, and the original webpage is displayed normally.

S540: Acquire webpage source code.

When the URL entered by the user is in the list of URLs where the custom webpage interface needs to be inserted, a webpage rendering process is stopped, and an http request is initiated to the webpage server, to acquire information about the corresponding webpage source code.

S550: Search for a location where a webpage node needs to be inserted.

The position for inserting the webpage node is delivered by the server, and after the node insertion position delivered by the server is acquired, a dynamic script is used to find a corresponding insertion location in the webpage source code, and the custom interface is inserted. During a process of searching for the location where the webpage node needs to be inserted, the webpage source code is traversed according to the custom interface code resource, to determine the location of the webpage node that needs to be added for adding the custom webpage interface. In one embodiment, a webpage node insertion method: appendChild, provided by JavaScript is used to insert, into the webpage source code, the webpage node for displaying the custom webpage interface, which implements, without adding additional interface layer code on the client terminal, adding a custom content interface to the webpage, thereby enriching displayed content.

S560: Insert the webpage node.

Content of the webpage node for displaying the custom webpage interface is inserted into the webpage source code by using the dynamic script. In the custom webpage node that is inserted into the webpage source code by using the dynamic script, the custom webpage interface is implemented by means of embedding a webpage node. The embedded script is essentially a text segment that can be delivered, and the node insertion operation is also universal. As long as it is ensured that a webpage can be normally displayed after a custom interface node is inserted, any interface can be inserted into different webpages without modifying the client terminal. In a process of inserting, by using the dynamic script, the content of the webpage node for displaying the custom webpage interface into the webpage source code, the dynamic script may be JavaScript, Jquery, or PHP.

S570: Display a webpage.

A new webpage into which the webpage node for displaying the custom webpage interface has been inserted is submitted to a browsing kernel for rendering, and the webpage that includes the custom webpage interface is displayed. After an interface that needs to be displayed appears, the user may further perform operations on the webpage, and the user's operations are not hindered. The custom interface is implemented by means of embedding a webpage node, and is integrated with the original webpage.

S580: Normally display the original webpage.

Specifically, when the URL entered by the user is not in the list of URLs where the custom webpage interface needs to be added, a process of browsing the webpage is continued, and the original webpage is displayed normally.

The embodiment of the method for displaying webpage custom content uses a webpage dynamic script language: JavaScript, to perform webpage node traversing and insertion, and a custom content interface can be added to a webpage without adding additional interface layer code on the client terminal, thereby enriching displayed content.

In conclusion, in the method for displaying webpage custom content of the present invention, after a user enters a URL into an address bar and accesses a webpage, if a custom interface needs to be loaded on the currently accessed webpage, a rendering operation on a webpage node is stopped, and webpage source code that is returned by a server of the URL accessed by the user is intercepted; a new webpage node is created at a position where a webpage node needs to be inserted, to insert the custom interface into the webpage, and then, a rendering and displaying operation is performed on the webpage node. The inserted custom interface is an external resource file for an application program, and can be dynamically updated and delivered by the server. A client terminal only needs to update data after a new custom webpage interface resource is delivered, and it is unnecessary to modify code and resources on the client terminal. The server delivers a URL list and custom webpage content resources, which implements displaying a webpage added with custom content after the user opens the webpage.

On an iPad system platform, a UC browser and a resource delivery server can be used to implement the method for displaying custom webpage content. The method for displaying custom webpage content implemented is described below.

1. Start a browser; subsequently, the browser sends a request to a background service delivery server, to acquire a list of URLs where a custom webpage interface needs to be inserted and a corresponding custom interface code resource.

Figure 8:
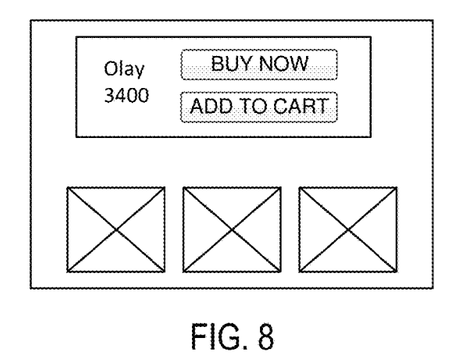
FIG. 8 is a sample webpage that corresponds to a custom node generated via a method for displaying webpage custom content according to an embodiment of the present invention.

FIG. 8 shows a view of a webpage display corresponding to a custom node in the method for displaying webpage custom content. For example, if a URL: www.jd.com that a user wants to access is in the list of URLs of which the custom webpage interface needs to be inserted, a webpage display that is corresponding to the custom node and delivered by a server of the corresponding website is as shown in FIG. 8, where displayed content is different price comparison information according to different webpages of the website.

2. The user opens a webpage by using the browser, and before a webpage request is initiated to a webpage server, the server determines whether a domain name of the webpage that needs to be accessed is in the list of URLs where the custom webpage interface needs to be inserted, and if the domain name of the webpage is not in the domain name list, for example, if www.baidu.com is accessed currently, a normal webpage browsing process is performed.

3. If the current domain name is in the list of URLs where the custom webpage interface needs to be inserted, for example, if www.XX.com is accessed, an http request is initiated to the webpage server, and after webpage source code is acquired, a process of rendering and depicting the webpage is stopped; the webpage source code is traversed according to the correspondingly delivered custom interface code resource, to find a webpage node position where the custom webpage node code needs to be added.

4. After the webpage node position where the webpage code resource needs to be inserted, a webpage node insertion method using JavaScript is used to insert the custom webpage node code that is delivered by the server in Step 1.

5. Submit the webpage source code into which the custom webpage node code has been inserted to the kernel of the browser for webpage rendering and depicting, and display, for the user, a webpage added with the custom interface.

Figure 7:
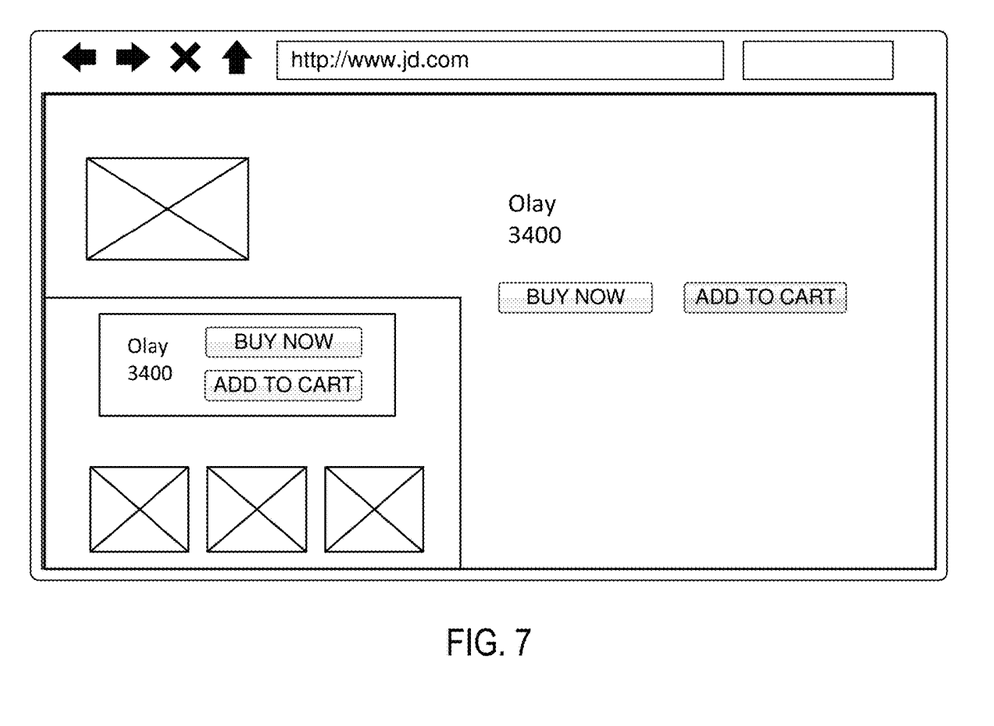
FIG. 7 is a sample webpage after a custom interface is added via a method for displaying webpage custom content according to an embodiment of the present invention.

FIG. 7 shows a diagram of a webpage display after a custom interface is added in a method for displaying webpage custom content according to an embodiment of the present invention. As shown in FIG. 7, a custom interface that is added according to the method for displaying webpage custom content is the interface in the large block on the bottom left of FIG. 7, in which price comparison information is displayed, and the custom interface is integrated with the webpage interface, and does not hinder user's operations on the webpage.

Figure 6:
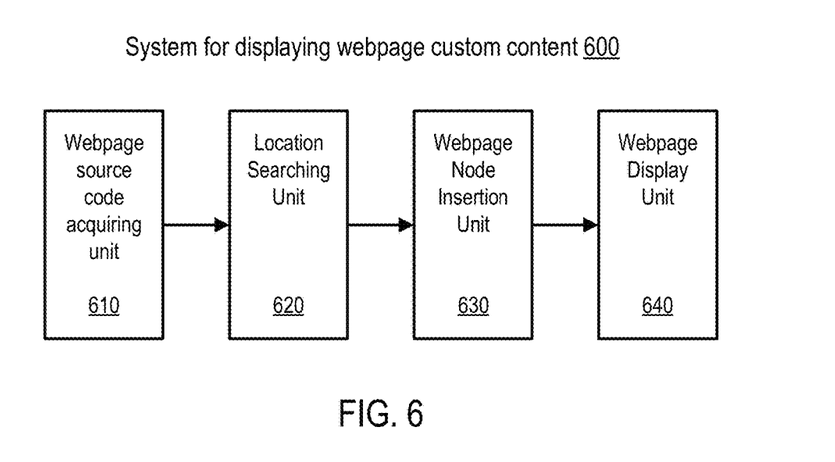
FIG. 6 is a schematic block diagram of a system for displaying webpage custom content according to an embodiment of the present invention.

Corresponding to the foregoing method, the present disclosure further provides a system for displaying webpage custom content. FIG. 6 shows a logic structure of a system for displaying webpage custom content according to an embodiment of the present invention.

As shown in FIG. 6, a system 600 for displaying webpage custom content provided by the present disclosure includes a webpage source code acquiring unit 610, a location searching unit 620, a webpage node insertion unit 630, and a webpage display unit 640.

The webpage source code acquiring unit 610 is configured to: when a custom webpage interface needs to be inserted into a webpage to be accessed, acquire webpage source code of the webpage to be accessed, and stop rendering the webpage to be accessed; the location searching unit 620 is configured to: after the webpage source code of the webpage to be accessed is acquired, acquire, according to a code resource of the custom webpage interface, a location where a webpage node of the custom webpage interface needs to be inserted; the webpage node insertion unit 630 is configured to: according to the found position where the webpage node of the custom webpage interface needs to be inserted, insert content of the webpage node of the custom webpage interface into the webpage source code; and the webpage display unit 640 is configured to perform webpage rendering on the webpage source code into which the content of the webpage node of the custom webpage interface has been inserted, and display a rendered webpage for a user.

The webpage source code acquiring unit 610 further includes: a URL determining unit (not shown in the figure), configured to determine, according to a list of URLs where the custom webpage interface needs to be inserted, whether the custom webpage interface needs to be inserted into the webpage to be accessed, that is, when a mobile browser initiates an access request to a server according to a URL entered by the user, the mobile browser determines whether the URL entered by the user is in the list of URLs where the custom webpage interface needs to be inserted; when the custom webpage interface needs to be inserted into the webpage to be accessed, acquire the webpage source code of the webpage to be accessed, and instruct the webpage display unit 640 to stop rendering the webpage to be accessed; and when the custom webpage interface does not need to be inserted into the webpage to be accessed, instruct the webpage display unit 640 to continue a process of browsing the webpage and display the original webpage normally.

In the location searching unit 620, the code resource of the custom webpage interface includes: a URL of a webpage into which the custom webpage interface needs to be inserted, an insertion location of the webpage node of the custom webpage interface, and a webpage node code segment of the custom webpage interface.

In the webpage node insertion unit 630, the content of the webpage node for displaying the custom webpage interface is inserted into the webpage source code by using a dynamic script, a node insertion location is delivered by the server, and after the node insertion location delivered by the server is acquired, a corresponding location is found in the webpage source code by using the dynamic script, and a new webpage node is inserted.

In some embodiments, in the webpage node insertion unit 630, the dynamic script may be JavaScript, Jquery, PHP, or the like.

The method and system for displaying webpage custom content of the present disclosure solve the problem that code and an interface of a client terminal need to be modified to display custom content, which reduces costs on labor and resources. The operation is flexible, and at the same time, rich browsing experience can be provided for users.

Another aspect of the disclosure is directed to a non-transitory computer-readable medium storing instructions which, when executed, cause one or more processors to perform the method, as discussed above. The computer-readable medium may include volatile or non-volatile, magnetic, semiconductor, tape, optical, removable, non-removable, or other types of computer-readable storage medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units/blocks may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for displaying a webpage with custom content. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for displaying webpage content by a web browser, comprising steps performed by the web browser including:
    acquiring a list of URLs where a custom webpage interface needs to be inserted and a code resource corresponding to the custom webpage interface; and
    determining, according to the list of URLs where the custom webpage interface needs to be inserted, whether the custom webpage interface needs to be inserted into the webpage to be accessed;
    if it is determined that the custom webpage interface needs to be inserted into the webpage to be accessed:
        acquiring webpage source code of the webpage to be accessed and the code resource corresponding to the custom webpage interface, wherein the code resource corresponding to the custom webpage interface includes a URL of the webpage to be accessed, an insertion location of the webpage node of the custom webpage interface, and a webpage node code segment of the custom webpage interface;
        stopping rendering of the webpage to be accessed;
        searching, in the acquired webpage source code, and according to the code resource corresponding to the custom webpage interface to be displayed together with the webpage, for the insertion location of the webpage node of the custom webpage interface where a new webpage node is to be created in order to insert the custom webpage interface;
        adding the webpage node code segment of the custom webpage interface into the webpage source code at the searched insertion location;
        sending the webpage source code into which the webpage node code segment of the custom webpage interface has been added to a kernel of the web browser; and
        performing, by the kernel of the web browser, webpage rendering on the webpage source code into which the webpage node code segment of the custom webpage interface has been added, and displaying a rendered webpage including the custom webpage interface; and
    if it is determined that the custom webpage interface does not need to be inserted into the webpage to be accessed, continuing a process of browsing the webpage, and normally displaying the original webpage.

2. The method for displaying webpage content of claim 1, wherein the webpage node code segment of the custom webpage interface is added into the webpage source code by using a dynamic script.

3. The method for displaying webpage content of claim 2, wherein the dynamic script is written in PHP.

4. The method for displaying webpage content of claim 1, wherein the adding a webpage node code segment comprises adding a webpage node code segment to add the custom webpage interface without adding additional interface layer code.

5. A system for displaying webpage content, wherein the system comprises:
    one or more processors; and
    memory storing web browser instructions, when executed by the one or more processors, configured to cause the one or more processors to:
    acquire a list of URLs where a custom webpage interface needs to be inserted and a code resource corresponding to the custom webpage interface;
    determine, according to the list of URLs where the custom webpage interface needs to be inserted, whether the custom webpage interface needs to be inserted into the webpage to be accessed;
    if the custom webpage interface needs to be inserted into the webpage to be accessed:
        acquire webpage source code of the webpage to be accessed and the code resource corresponding to the custom webpage interface, wherein the code resource corresponding to the custom webpage interface includes a URL of the webpage to be accessed, an insertion location of the webpage node of the custom webpage interface, and a webpage node code segment of the custom webpage interface;
        stop rendering of the webpage to be accessed;
        searching, in the acquired webpage source code, and according to the code resource corresponding to the custom webpage interface to be displayed together with the webpage, for the insertion location of the webpage node of the custom webpage interface where a new webpage node is to be created in order to insert the custom webpage interface;
        add the webpage node code segment of the custom webpage interface into the webpage source code at the searched insertion location;
        sending the webpage source code into which the webpage node code segment of the custom webpage interface has been added to a kernel of the web browser; and
        perform, by the kernel of the web browser, webpage rendering on the webpage source code into which the content of the new webpage node has been added, and display a rendered webpage including the custom webpage interface; and
    when the custom webpage interface does not need to be inserted into the webpage to be accessed, continue a process of browsing the webpage and display the original webpage normally.

6. The system for displaying webpage content of claim 5, wherein the webpage node code segment of the custom webpage interface is added into the webpage source code by using a dynamic script.

7. The system for displaying webpage content of claim 6, wherein the dynamic script is written in PHP.

8. A terminal, comprising:
    a processor; and
    a memory that stores computer executable web browser instructions, that when executed by the processor, cause the processor to perform:
    acquiring a list of URLs where a custom webpage interface needs to be inserted and a code resource of the webpage interface;
    determining, according to the list of URLs where the custom webpage interface needs to be inserted, whether the custom webpage interface needs to be inserted into the webpage to be accessed;
    if the custom webpage interface needs to be inserted into the webpage to be accessed:
        acquiring webpage source code of the webpage to be accessed and the code resource corresponding to the custom webpage interface, wherein the code resource corresponding to the custom webpage interface includes a URL of the webpage to be accessed, an insertion location of the webpage node of the custom webpage interface, and a webpage node code segment of the custom webpage interface;

stopping rendering of the webpage to be accessed;
in the acquired webpage source code, searching, according to the code resource corresponding to the custom webpage interface to be displayed together with the webpage, for a the insertion location of the webpage node of the custom webpage interface where a new webpage node-is to be created in order to insert the custom webpage interface;
according to the searched insertion location, adding the webpage node code segment of the custom webpage interface into the webpage source code;
sending the webpage source code into which the webpage node code segment of the custom webpage interface has been added to a kernel of the web browser; and
performing, by the kernel of the web browser, webpage rendering on the webpage source code into which the webpage node code segment of the custom webpage interface has been added, and displaying a rendered webpage including the custom webpage interface; and
when the custom webpage interface does not need to be inserted into the webpage to be accessed, continue a process of browsing the webpage and display the original webpage normally.

9. The terminal of claim 8, wherein adding a webpage node code segment of the custom webpage interface into the webpage source code comprises:
using a dynamic script to add the webpage node code segment of the custom webpage interface into the webpage source code.

10. The terminal of claim 9, wherein the dynamic script is written in PHP.

11. A non-transitory computer readable storage medium that stores computer executable web browser instructions, that when executed by a processor, causes the processor to perform:
acquiring a list of URLs where the custom webpage interface needs to be inserted and the code resource corresponding to the custom webpage interface;
determining, according to the list of URLs where the custom webpage interface needs to be inserted, whether the custom webpage interface needs to be inserted into the webpage to be accessed;
if the custom webpage interface needs to be inserted into the webpage to be accessed:
acquiring webpage source code of the webpage to be accessed and the code resource corresponding to the custom webpage interface, wherein the code resource corresponding to the custom webpage interface includes a URL of the webpage to be accessed, an insertion location of the webpage node of the custom webpage interface, and a webpage node code segment of the custom webpage interface;
stopping rendering of the webpage to be accessed;
searching, in the acquired webpage source code, and according to the code resource corresponding to the custom webpage interface to be displayed together with the webpage, for the insertion location of the webpage node of the custom webpage interface where a new webpage node is to be created in order to insert the custom webpage interface;
adding the webpage node code segment of the custom webpage interface into the webpage source code at the searched insertion location;
sending the webpage source code into which the webpage node code segment of the custom webpage interface has been added to a kernel of the web browser; and
performing, by the kernel of the web browser, webpage rendering on the webpage source code into which the webpage node code segment of the custom webpage interface has been added, and displaying a rendered webpage including the custom webpage interface; and
if the custom webpage interface does not need to be inserted into the webpage to be accessed, continuing a process of browsing the webpage, and normally displaying the original webpage.

12. The non-transitory computer readable storage medium of claim 11, wherein the webpage node code segment of the custom webpage interface is added into the webpage source code by using a dynamic script.

* * * * *